ated July 23, 1968

United States Patent Office

3,393,992
PROCESS FOR CONTACTING PLANTS WITH GROWTH EFFECTING CHEMICAL

Everett A. Mailey, Norristown, Pa., assignor to Pennsalt Chemicals Corporation, Philadelphia, Pa., a corporation of Pennsylvania
No Drawing. Original application Oct. 1, 1965, Ser. No. 492,306, now Patent No. 3,341,547, dated Sept. 12, 1967. Divided and this application Apr. 5, 1967, Ser. No. 644,044
1 Claim. (Cl. 71—90)

ABSTRACT OF THE DISCLOSURE

Process of contacting plants with a growth effecting amount of 3,4-dichloroisothiazole-5-carboxylic acid.

---

This application is a divisional of application Ser. No. 492,306, filed Oct. 1, 1965, now U.S. Patent No. 3,341,547.

In U.S. 3,155,678 there are disclosed numerous 3,5-dichloro-4-isothiazole compounds. The compounds of that patent are derived from the parent 3,5-dichloro-4-isothiazole carbonitrile which is in turn prepared by chlorinating 2,2-dicyano-1,1-di(alkali-metal) mercaptoethylene. The 3,5-dihalo-4-isothiazole carbonitrile and their derivatives are disclosed in U.S. 3,155,678 as having herbicidal activity when used at rather high concentrations on the order of 16 lbs. of active ingredient per acre.

In accord with the present invention, there are provided 3,4-dichloroisothiazoles of the structure

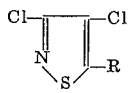

where R is a —CN, —COOH, —CONR$_1$R$_2$, or

where R$_1$ and R$_2$ are hydrogen or lower alkyl (e.g. methyl, ethyl, propyl, butyl), and R$_3$ is lower alkyl. These compounds may be prepared from basic chemicals: e.g., carbon disulfide, an alkali metal cyanide (e.g. sodium cyanide) and chlorine. The compounds are white crystalline solids having sharp melting points or colorless liquids having definite boiling points. The compounds are soluble in most common organic solvents such as ketones (acetone), ethers, aromatic hydrocarbons (benzene, xylene, etc.) and the like.

In view of the prior art disclosures, it is surprising that the compounds of this invention can be prepared. In 1962 Simmons et al. disclosed in J.A.C.S. 84, 4753, that carbon disulfide, sodium cyanide, and chlorine produce a dithiin and a binuclear isothiazole having the following structures respectively:

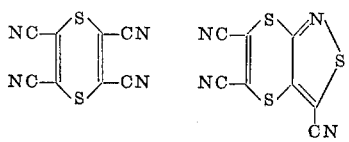

In carrying out their process, Simmons et al. reacted NaCN and CS$_2$ at 50° to 60° C., and the sodium cyanodithioformate thus formed was oxidized with chlorine at ice-bath temperature (—5 to 0° C.). In contrast, the process of this invention requires that the reaction product of an alkali metal cyanide and CS$_2$ (e.g. alkali metal cyanodithioformate) be chlorinated at higher temperature, ranging from room temperature (e.g. about 20° C.) to about 50° C. During the chlorination procedure, the reaction mass changes color several times, after which the product is worked up and purified. The process is carried out in a solvent system, preferably dimethylformamide, dimethylacetamide, formamide, or N-methyl pyrrolidone.

The 5-cyano-3,4-dichloroisothiazole of the invention is readily converted to the corresponding acid amides and alkyl imidates by known procedures.

In order to further illustrate the invention the following examples are given:

Example 1

Carbon disulfide (304 g., 4.0 moles) was added to sodium cyanide (196 g., 4.0 moles) in 1800 ml. dimethylformamide over a period of 74 minutes, allowing the temperature to rise with no external cooling. Upon completion of the addition, the mixture was heated at 60° C. for 51 minutes and then allowed to stand overnight. During the standing period crystalline sodium cyanodithioformate complex formed.

Chlorine gas (281 g., 4.0 moles) was then passed over the reaction mixture maintained at a temperature of 35–40° C. During the 1.5 hours addition time, the mixture passed through the following color changes: dark brown, red, dark brown, red, reddish yellow and brown. After the reaction mixture was stirred an additional one hour at ambient temperatures, filter aid (a diatomaceous earth) was added and the mixture was stirred and then filtered. The filter cake was washed with a minimum of dimethylformamide and the cake discarded. The combined filtrates were divided into two equal portions. Each portion was added to 6 liters of water with vigorous stirring. The resulting precipitate was filtered and washed well with water. The second portion was treated similarly and combined with the former portion. After the combined black solids were dried in a vacuum desiccator over NaOH, 219 g. of crude product was obtained. The crude product was steam distilled to give a 33% yield (based on NaCN) of product. Purification was also carried out by recrystallization from cyclohexane.

Elemental analysis, infrared spectrum, and molecular weight determination indicate the product to be 5-cyano-3,4-dichloroisothiazole, M.P. 83.5–85.0°, having the structure:

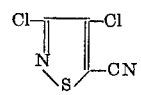

The above 5-cyano-3,4-dichloroisothiazole has little or no plant growth affecting activity, but the acid made from it is very active. Conversion of the nitrile to the acid is illustrated by the following example.

Example 2

To 300 milliliters of 2 N sodium hydroxide solution (12 grams, 0.3 mole NaOH) was added 15 g. (0.084 mole) of 5-cyano-3,4-dichloroisothiazole as prepared in Example 1 and the resulting mixture was heated. The solid was dissolved, the solution was cooled and acidified in the cold with concentrated HCl. The solid which formed on acidification was filtered off and recrystallized from boiling water to yield 9.5 grams (58% yield) of white crystalline material melting at 179 to 179.5° C., which analysis showed to be 3,4-dichloroisothiazole-5-carboxylic acid.

The following examples illustrates the effectiveness of the acid compound as a herbicide and compares its effectiveness with related prior art isomers.

Example 3

An emulsifiable concentrate was prepared to contain 10% by weight of 3,4-dichloroisothiazole-5-carboxylic acid, 65% by weight xylene, 20% by weight dimethylsulfoxide, and 5% by weight of an alkyl aryl polyether alcohol surfactant ("Triton" X 155).

Cotton plants (1 month old) were sprayed with the above emulsion over a two foot square area so that the plants received a dose equivalent to 1.0 and 5.0 pounds per acre. The last new leaf was marked at the time of spraying and effectiveness was measured by noting at suitable recorded time intervals the number of new leaves formed. High activity is shown by the reduction in the number of new leaves formed.

TABLE I.—PLANT GROWTH CONTROL WITH 3,4- AND 3,5-DICHLOROISOTHIAZOLE-CARBOXYLIC ACIDS

| | Number of New Leaves of Trifoliate Growth on Cotton | | |
|---|---|---|---|
| Rate (lbs./acre) | 0.0 | 1.0 | 5.0 |
| 3,4-dichloroisothiazole-5-carboxylic acid | 8 | [1] 3 | [1] 2 |
| 3,5-dichloroisothiazole-4-carboxylic acid | 8 | 9 | 11 |

[1] Leaves small and curled.

It is clear from the above data that the 3,4-dichloroisothiazole-5-carboxylic acid effects surprisingly better growth inhibition than does the 3,5-dichloro-4-carboxylic acid. In other tests against Black Valentine Beans the 3,4-dichloroisothiazole - 5-carboxylic acid was also very effective in inhibiting trifoliate growth.

Example 4.—N-ethyl-3,4-dichloroisothiazolecarboxamide

The acid of Example 2 (8.0 g., 0.04 mole) was treated with 100 g. thionyl chloride and the mixture was refluxed for one hour after which the excess thionyl chloride was removed under reduced pressure (benzene used to remove last traces of thionyl chloride). To the acid chloride, taken up in dry tetrahydrofuran, was added dropwise 3.60 g. (0.08 mole) ethylamine in tetrahydrofuran. The salt was filtered off and the filtrate evaporated to dryness to yield a white solid which was recrystallized from boiling water (M.P. 77.0–77.5° C.). Analysis confirmed this compound to be

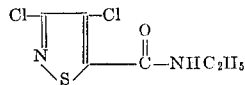

When evaluated against cotton plants at 10 pounds per acre, 60% of trifoliate growth inhibition was obtained in 7 days with 90% desiccation.

Example 5.—3,4-dichloroisothiazolecarboxamide

Concentrated sulfuric acid (35 g.) and 5-cyano-3,4-dichloroisothiazole (5.0 g., 0.028 mole) were heated at 105° for 20 minutes, after which the solution was added to ice. The white solid was filtered off and recrystallized from ethanol-water to obtain a quantitative yield of amide, M.P. 157.5–160°. Analysis confirmed the compound to be

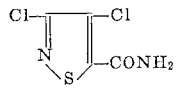

Evaluation against cotton at 5 pounds per acre showed 40% desiccation of the plants in 14 days. Evaluation on Black Valentine Beans at 1 pound per acre showed 60% trifoliate growth inhibition in 14 days.

Example 6.—Ethyl-3,4-dichloroisothiazole-5-imidate

Anhydrous sodium carbonate (8.9 g., 0.084 mole), 5-cyano-3,4-dichloroisothiazole (15 g., 0.084 mole), and 150 cc. absolute ethanol were refluxed for 2.3 hours. After the mixture was cooled and filtered and the excess alcohol removed by distillation at reduced pressures, a pale yellow oil was obtained at 78–80° C./0.03 mm. Hg (15.4 g., 82% yield). Analysis confirmed that the compound is

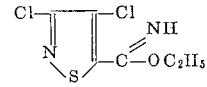

At 10 pounds per acre on cotton, this compound effected 40% desiccation in 14 days.

It will be understood that numerous changes and variations may be made from the above examples and descriptions without departing from the spirit and scope of the invention.

I claim:

1. The process of contacting plants with a growth inhibition amount of 3,4-dichloroisothiazole-5-carboxylic acid.

References Cited

UNITED STATES PATENTS 3,155,678   11/1964   Hatchard _____ 71—90

JAMES O. THOMAS, Jr., *Primary Examiner.*